United States Patent
Smothers

(10) Patent No.: US 7,093,562 B2
(45) Date of Patent: Aug. 22, 2006

(54) BIRD FEEDER AND KIT

(75) Inventor: Keith S. Smothers, 9049 Laguna Place Way, Elk Grove, CA (US) 95758

(73) Assignee: Keith S. Smothers, Elk Grove, CA (US)

( * ) Notice: Subject to any disclaimer, the term of this patent is extended or adjusted under 35 U.S.C. 154(b) by 0 days.

(21) Appl. No.: 10/801,039

(22) Filed: Mar. 16, 2004

(65) Prior Publication Data

US 2004/0244704 A1 Dec. 9, 2004

Related U.S. Application Data

(60) Provisional application No. 60/539,333, filed on Jan. 28, 2004, provisional application No. 60/470,892, filed on May 16, 2003.

(51) Int. Cl.
*A01K 39/02* (2006.01)

(52) U.S. Cl. ............... 119/72; 222/153.05; 222/153.09

(58) Field of Classification Search ............. 119/51.5, 119/61.55, 71, 72, 72.5; 229/103.1; 220/707, 220/709; 222/153.05, 153.06, 153.09, 153.1
See application file for complete search history.

(56) References Cited

U.S. PATENT DOCUMENTS

| | | | |
|---|---|---|---|
| 2,708,421 A * | 5/1955 | Jauch ........................ 119/71 |
| 2,775,226 A | 12/1956 | Early |
| 2,891,711 A | 6/1959 | Early |
| 3,354,868 A | 11/1967 | Woodling |
| 3,441,002 A | 4/1969 | Lawalin et al. |
| 3,794,202 A * | 2/1974 | Unger ........................ 215/22 |
| 3,945,344 A | 3/1976 | Melrath |
| 3,958,535 A * | 5/1976 | Salvia ........................ 119/72.5 |
| 3,977,557 A * | 8/1976 | Hazard ........................ 215/274 |
| 3,990,403 A * | 11/1976 | Jacobs ........................ 119/72.5 |
| 4,104,987 A | 8/1978 | Winston |
| 4,223,637 A | 9/1980 | Keefe |
| 4,223,941 A | 9/1980 | Janzen et al. |
| 4,408,565 A | 10/1983 | Kerbs et al. |
| 4,574,738 A | 3/1986 | Tominaga |
| 4,606,298 A | 8/1986 | Bridge |
| 4,664,066 A | 5/1987 | Steuernagel et al. |
| 4,747,370 A | 5/1988 | Olson |
| 4,896,628 A | 1/1990 | Kadunce |
| 4,957,797 A | 9/1990 | Maeda et al. |
| 4,958,595 A | 9/1990 | Richman et al. |
| 4,989,548 A | 2/1991 | Short et al. |
| 5,140,945 A | 8/1992 | Barnhart et al. |
| 5,479,879 A | 1/1996 | Biek |
| 5,479,881 A | 1/1996 | Lush et al. |
| 5,495,825 A | 3/1996 | Eckelman |
| 5,634,429 A | 6/1997 | Loomis et al. |
| 5,740,758 A | 4/1998 | Damm |
| 5,740,759 A | 4/1998 | Cummings |
| 6,293,226 B1 * | 9/2001 | Hwang ........................ 119/72 |
| 6,374,773 B1 * | 4/2002 | McIntyre et al. ............. 119/72 |
| 6,718,912 B1 * | 4/2004 | Pappas ........................ 119/72.5 |

(Continued)

*Primary Examiner*—Michael J. Carone
*Assistant Examiner*—Bret Hayes
(74) *Attorney, Agent, or Firm*—Nixon Peabody LLP

(57) ABSTRACT

A hummingbird feeder and kit including a solution reservoir, a feeding assembly, and a coupler for unreleasably coupling said feeding assembly to said solution reservoir. The reservoir includes either a dissolvable solid or a premixed feed solution. The unreleasable coupling between the reservoir and the feeding assembly prevents the subsequent re-use of the hummingbird feeders, minimizing the user's contact with bacteria-infested feeding solution and the spread of disease among birds.

30 Claims, 5 Drawing Sheets

U.S. PATENT DOCUMENTS 6,758,165 B1 * 7/2004 Pappas et al. ............. 119/72.5
6,772,914 B1 * 8/2004 Hubmann et al. ..... 222/153.09
2002/0108579 A1 * 8/2002 Borries ...................... 119/52.1
2003/0168423 A1 * 9/2003 Williams ................... 215/204

* cited by examiner

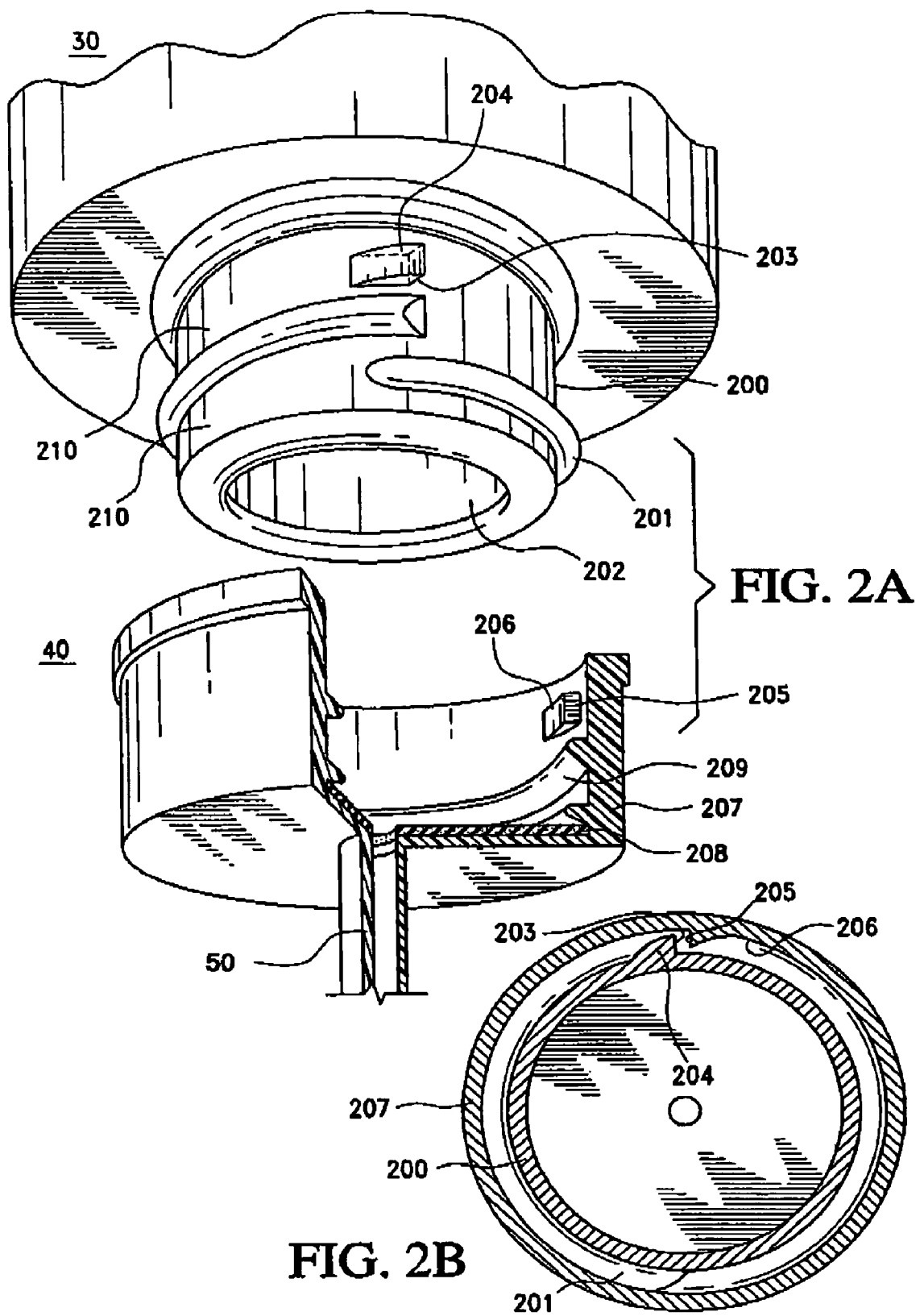

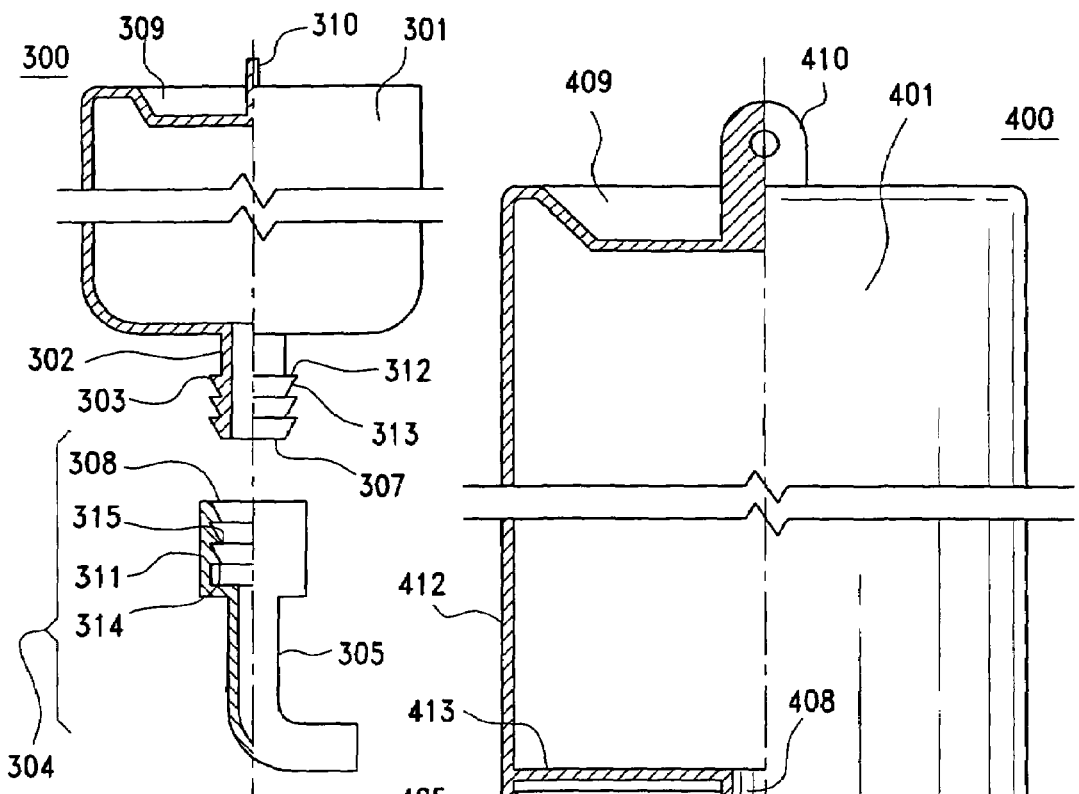
FIG. 3
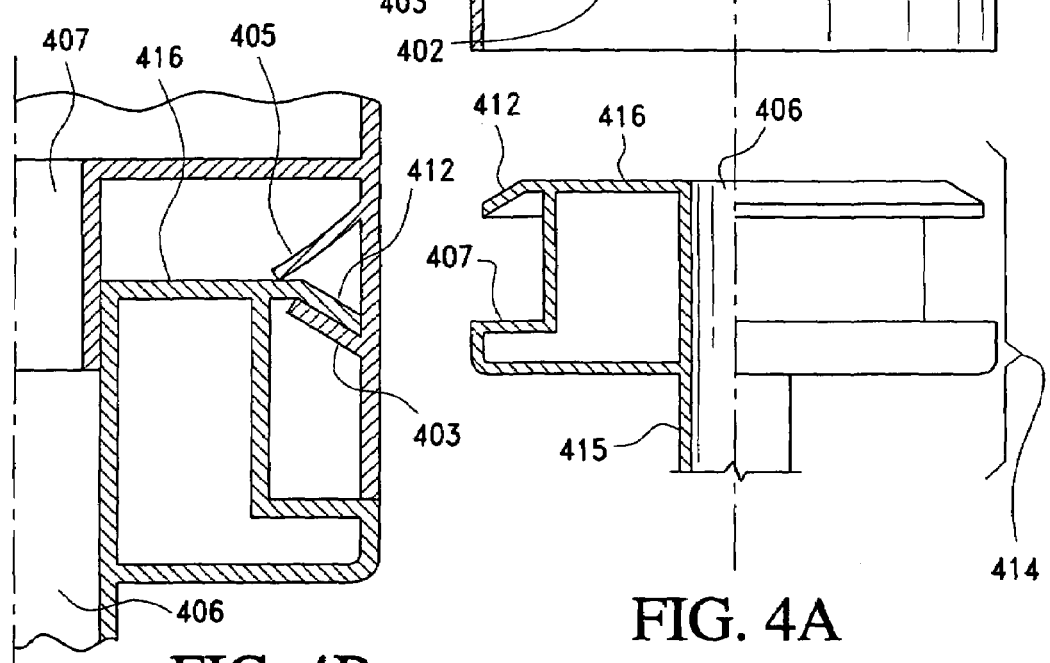
FIG. 4B
FIG. 4A

BIRD FEEDER AND KIT

RELATED APPLICATION DATA

This application is a non-provisional application of U.S. provisional patent applications Ser. No. 60/539,333, filed Jan. 28, 2004 and Ser. No. 60/470,892 filed May 16, 2003.

BACKGROUND OF THE INVENTION

1. Field of the Invention

The invention relates generally to the field of bird feeders, more particularly to disposable, recyclable, sanitary hummingbird feeders that prevent the contamination of hummingbird feeding solution, prevent the spread of disease, and do not require cleaning through mechanisms designed to prevent re-use.

2. Description of Related Art

Hummingbird feeding is an increasingly popular hobby among adults and children alike. Indeed, it has become a popular pastime to feed and watch hummingbirds at a feeder at one's residence, and commercial establishments. The feeding of hummingbirds is not only interesting and enjoyable, but further serves the purpose of providing necessary food for the birds during time of diminished natural food supply. In fact, hummingbird feeding has allowed a variety of hummingbird species to extend their historic range into areas where they could not survive without human assistance and to winter north or in a more severe climate. Of all birds, hummingbirds are of particular interest owing to their bright, vibrant colors, their tiny size and their unusual flight patterns. Hummingbirds, however, are not drawn to the conventional bird feeder serving solid food. In the wild, hummingbirds feed on the nectar of a variety of plants and small insects. To feed hummingbirds, therefore, man is limited to providing nectar or a nectar substitute.

Accordingly, conventional hummingbird feeders are designed to store and dispense liquids, typically mixtures of sugar and water. Unfortunately, however, there are many problems and attendant frustration attributable to conventional hummingbird feeders, as those who have tried their hand at feeding hummingbirds are well aware.

In warm climates, in particular, mixtures of sugar and water exhibit a tendency to ferment and provide a media for the growth of bacteria, mold, and mildew. The results of the chemical reaction and contamination of the feeding solution endangers the health of the birds being fed. One such disease known as candidiasis causes swelling of the bird's tongue. A major frustration commonly encountered by owners of conventional feeders, therefore, is the requirement that, in order to maintain a healthy and attractive feeder, the feeder must be cleaned on a regular basis—in most instances, three times per week or more depending on location and temperature.

The cleaning process is a multi-step process that inevitably entails steps of a) removing the feeder from its outdoor location, b) disassembling the feeder, c) cleaning and disinfecting its components—many of which have spaces in tight tolerances that are hard to clean, d) safely disposing of the bio-contaminated solution, e) mixing new solution, f) refilling the feeder with fresh solution, g) reassembling the feeder, and h) replacing the feeder at its outdoor location. The process of cleaning hummingbird feeders, therefore, is a time consuming, messy, and unsanitary process that detracts from the enjoyment of feeding hummingbirds and quickly deters many from continuing to use their feeders.

Because of the difficulties and inconveniences associated with cleaning hummingbird feeders, users often simply refill the hummingbird feeders with fresh solution, while foregoing the cleaning process. This leads to accumulation of harmful bacteria, mold, and mildew in the feeder which, if digested by the hummingbird, is often fatal.

Similar risks are present even to those who clean their hummingbird feeders, as the bacteria and mold that accumulates in hummingbird feeders can also present health risks to humans. Moreover, unless the prerequisite precautions are taken in cleaning the feeders, there is also a significant risk of infection to the bird. For this reason, conventional hummingbird feeders are particularly unsuitable for children who are likely incapable of safely cleaning the feeders absent adult supervision. With the present invention, even children can be some of the world's most avid hummingbird feeding enthusiasts.

There is a need, therefore, for a non-reusable hummingbird feeder made of inexpensive disposable or recyclable materials that can be safely discarded or recycled once the feeding solution is fermented, contaminated, depleted, or otherwise rendered ill-suited and unsafe for consumption by hummingbirds or exposure to humans.

BRIEF SUMMARY OF INVENTION

In view of the above, it is a general purpose of this invention and its various embodiments, which will be described in greater detail, to provide a one-time use hummingbird feeder.

An aspect of the present invention is to provide a hummingbird feeder that does not require cleaning.

Another aspect of the present invention is to provide a hummingbird feeder that is not suitable for re-use.

Another aspect of the present invention is to provide an inexpensive and economical hummingbird feeder that can be cheaply, safely, and easily disposed in an environmentally-safe manner.

A further aspect of the present invention is to provide a sanitary hummingbird feeder that reduces the instances of disease among hummingbirds.

Yet another aspect of the present invention is to provide a hummingbird feeder having a tamper-resistant solution reservoir.

A further aspect of the present invention is to provide a hummingbird feeder with a means for preventing the contamination of the feeding solution.

Another aspect of the present invention is to provide a hummingbird feeder kit comprising a reservoir with pre-made solution or nourishment and a feeding assembly adapted to render the feeder ready for use when unreleasably engaged to the reservoir.

These and other objects and advantages are achieved by providing a hummingbird feeder comprising a solution reservoir, a feeding assembly, and a coupler for unreleasably coupling said feeding assembly to said solution reservoir, thereby preventing the subsequent re-use of the hummingbird feeders and minimizing the user's contact with bacteria-infested feeding solution.

Further, the means for unreleasably coupling the feeding assembly to the solution reservoir is destroyed if the feeding assembly is subsequently disengaged from the solution reservoir, thereby preventing the subsequent re-use of the hummingbird feeders and minimizing the user's contact with bacteria-infested feeding solution.

In a yet another embodiment, the feeding assembly has single feed and multiple feed capability.

The invention will be better understood and aspects of the inventions other than those set forth above will become apparent when consideration is given to the following detailed description thereof.

BRIEF DESCRIPTION OF DRAWINGS

FIG. 2A is an exploded view of a neck of a reservoir and a one-way screw cap embodiment of the present invention.

FIG. 2B is a cross-section view along line 2B in FIG. 1B illustrating a one-way feeding assembly screw cap of the present invention.

FIG. 3 illustrates another embodiment of the present invention.

FIG. 4A illustrates yet another embodiment of the present invention.

FIG. 4B illustrates a magnified view of a feeding assembly in a locking position with a reservoir of FIG. 4A.

DETAILED DESCRIPTION OF INVENTION

Figure 1A:
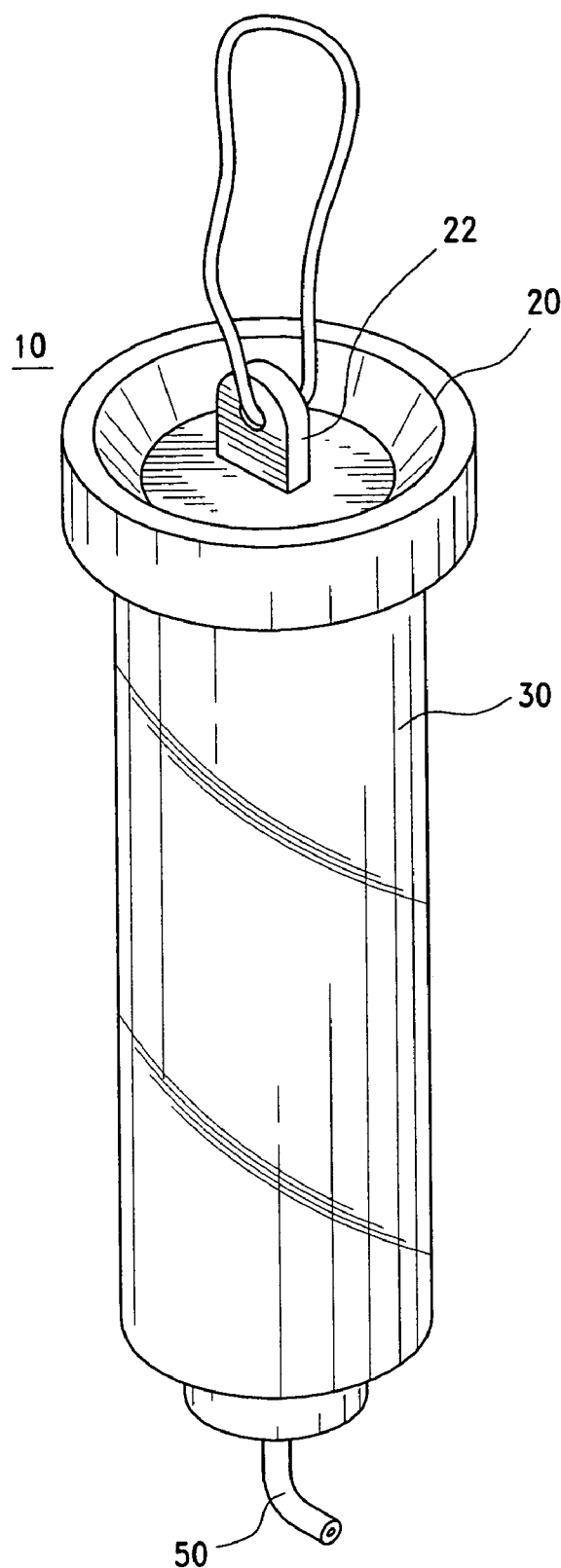
FIG. 1A is a top perspective view of an embodiment of a feeder of the present invention.

Throughout this specification and the drawing figures associated with this specification, numerical labels of previously shown or discussed features may be reused in another drawing figure to indicate similar features.

Figure 1B:
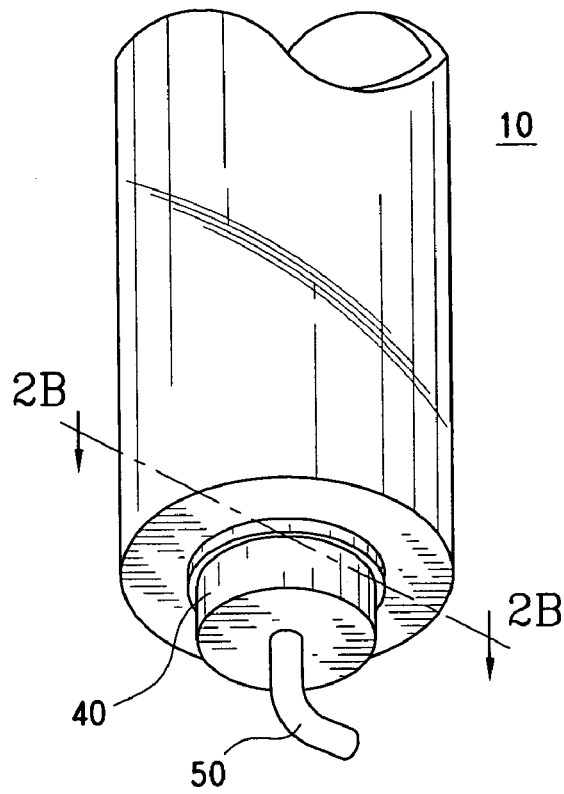
FIG. 1B is a bottom perspective view of the feeder in FIG. 1A.

As illustrated in FIG. 1, a feeder 10 comprises a hanger tab 22, a solution reservoir 30 preferably with built in crawling insect barrier 20, and the feeding tube assembly 40 with a feeding tube 50. The feeding tube assembly 40 is easily unreleasably coupled to the feeding reservoir 30. The assembly is manufactured to incorporate ease of use and a one-time use feature that is explained in detail hereafter in reference to various exemplary embodiments.

As shown in FIG. 1, hanging tab 22 is provided to allow feeder 10 to be hung and used at a desired location. The crawling insect fluid barrier reservoir 20, which may merely be open on its topside, or an optional attachment to reservoir 30, so when filled with a liquid such as water or cooking oil, will prevent crawling insects from reaching the feeding tube 50 and accessing feeding solution.

Feeding solution reservoir 30, as exemplified in FIG. 1, is an elongated cylindrically shaped container for housing hummingbird feed solution. Other geometric shapes and sizes, as well as shapes in form of animals and flowers, of different colors for the solution reservoir are possible. The volume in the solution reservoir, or course, can vary depending on size of the solution reservoir and the amount of feeding solution to be distributed. In addition, this feeder could be incorporated for feeding other types of birds and animals.

As shown in FIG. 2A, the bottom side of solution reservoir 30 has neck 200. On the outside wall of neck 200 is a raised helical thread 201 defining a helical path 210. The neck 200 further has a locking member comprising a ramped surface 204 and a blocking surface 203, which are positioned in the helical path 210. The neck 200 also has an opening 202 for a feed solution to flow out into feeding tube assembly 40.

As further shown in FIG. 2A, feeding assembly 40, which couples with neck 200 when the feeder is in a final state of assembly for use, comprises a cap portion having a wall 207. Within the wall 207 of the cap, there is provided a raised helical thread member 206 engaging with the helical path 210 on the neck 200 in a coupled position. In addition to the helical thread member 206 on the inside of wall 207 of the feeding tube assembly, there is a complementary locking member having a ramped surface 206 and a blocking surface 205, which cooperate with the ramped surface 204 and blocking surface 203 on the neck 200 to allow a one-way coupling of the feeding tube assembly 40 and the neck 200 of the feed reservoir 30. There is also provided inside the feeding tube assembly 40 an optional gasket 208 which compresses against an opening rim 202 of the neck 200 to provide a tight seal between the feeding tube assembly 40 and the neck when the feeding tube assembly is completely screwed onto and interlocked with the neck 200.

While assembling the reservoir 30 and the feeding tube assembly 40 together to form a complete feeder 10, the threaded feeding tube assembly is screwed onto the neck 200 of the reservoir 30 in a clockwise closing direction. During the clockwise closing motion, and as the blocking surface 203 on the neck 200 reaches the blocking member of the feeding tube assembly 40, additional torque is applied to cause the ramped surfaces 204 and 206 to slide over each other reaching a blocking and locking position where the blocking surfaces 205 and 203 directly face each other in an abutting position thus preventing any counter-clockwise or reverse movement of the feeding tube assembly relative to the neck 200. An illustration of the locking and blocking members in an engaged and locked position is shown in FIG. 2B.

As the ramped surfaces 204 and 206 slide over each reaching a locking and blocking position described above, a positive audible feedback, such as a clicking noise, may be created, which indicates that the unreleasable one-way coupling between the reservoir 30 and the feeding tube assembly 40 is completed.

The blocking member 203 and the ramped surface 204 of the neck 200, as well as the blocking member 205 and the ramped surface 206 of the feeding tube assembly 40 are preferably positioned such that a positive blocking and locking affect is accomplished immediately when the feeding tube assembly 40 is screwed onto the neck 200.

The above-described unreleasably one-way coupling is possible with the selection of the material constituting the neck 200 and feeding tube assembly 40 such that some deformation of one or both parts takes place during the engagement of the ramped surfaces. It is noted that proper tolerance, as well as proper material selection, between the coupling parts is essential to ensure that the ramped surfaces are able to slide over one another into place the locking and blocking members in a cooperative relationship, and to ensure that the blocking surfaces 205 and 203 maintain an abutting position against each other thus preventing the unscrewing or disassembling of the reservoir 30 and the feeding tube assembly 40. In such an interlocking position, the feeding tube assembly 40 is unreleasably coupled to the reservoir 30 in such a manner that renders the feeder 10 as a one-time use only feeder in which refilling the reservoir with a feeding solution would not be readily possible and thus reusing the feeder would be discouraged.

One of ordinary skill in the art will appreciate that the above-described embodiment is only an example of the one-way unreleasable coupling between the reservoir and the feeding tube assembly of the present invention. Variations of the embodiment are possible without departing from the spirit of the above-described one-way unreleasable coupling of the feeding tube assembly and the reservoir. For example, the locking and blocking member on the neck may be positioned at another location in the helical path on the neck; two helical paths may be disposed on the neck or on the feeding tube assembly; and, more than one of locking and blocking member may be disposed on the neck and on the feeding tube assembly.

As another embodiment of the locking and blocking members on the neck and on the feeding tube assembly, one of the locking and blocking member can be an ramped indentation of a sufficient depth to provide an abutment surface, while the other locking and blocking member is a raised or protruding member that fits into the indentation and resting against the abutment surface. The protruding member has a higher profile than the helical rib co-locating on the same side with the protruding member. This embodiment is also effective in allowing the neck and the feeding tube assembly to be rotated in a clockwise closing direction while in the process of being assembled but restricting them from being rotated in a counter-clockwise opening rotational direction in relation to each other once the members are in a locked position.

Another embodiment of the feeder of the present invention is shown in FIG. 3. The feeder 300 includes a feed reservoir 301 having a neck 302, a barrier 309 against crawling insect, and a hanging tab 310. The neck 302 includes an unreleasable coupler 303 which surround the outside of neck 302 with triangular-shaped flanges. Each triangular-shaped flange of the neck 302 comprises an abutment surface 312 and a ramped sliding surface 313. As shown in FIG. 3, there are three triangular-shaped flanges disposed around the neck 302. There can be any number of the triangular-shaped flange, however, at least two such triangular-shaped flanges are preferred.

The feeder 300 further includes a feeding tube assembly 304 connected to a feeding tube 305. The feeding tube assembly 304 comprises a cylindrical wall 311 with an interior surrounded by triangular-shaped indentations or flanges that unreleasably receive the triangular-shaped flanges on the unreleasable coupler 303 of the neck 302. Each triangular-shaped receiving flange or indentation on the feeding tube assembly 304 is comprised of an abutment surface 314 and a ramped sliding surface 315.

As an alternative to having triangular-shaped receiving flanges disposed annularly on the inside cylindrical wall 311, there may be a plurality of triangular-shaped notches or claws disposed at an equal distance from each other on the inside of the cylindrical wall 311. These notches or claws would interlock with the triangular-shaped flanges on the neck 302 when the feeding tube assembly is fitted over the neck 302.

In the feeding tube assembly 304, a gasket, not shown, that is similar to gasket 208 in FIG. 2A may be employed to provide an additional sealing to prevent liquid leakage between the feeding tube assembly 304 and rim 307 of the neck 302.

In use, once the reservoir 301 is determined to be filled with a feeding solution, the feeding assembly 304 is pushed onto the neck 302 to complete the assembling of the feeder 300. Some force will be necessary to overcome frictional forces between the unreleasable coupler of the neck 302 and the feeding tube assembly 304. By pushing the feeding tube assembly onto the neck 302, the ramped sliding surfaces 313 and 315 glide over one another in one direction. Once at least one triangular-shaped flanges on the neck 302 interlock with one of the triangular-shaped flanges or indentations on the feeding tube assembly 304, the abutment surfaces 312 and 314 abutting against each other thus preventing the feeding tube assembly from separating from the neck 302. In such a cooperative position, the feeding tube assembly 304 is unreleasably coupled to the reservoir in such a manner that renders the feeder 300 as a one-time use only feeder in which refilling the reservoir with a feeding solution would not be readily possible and thus reusing the feeder would be discouraged It is noted that by the above-discussed embodiment, as well as in other embodiments of the present invention discussed herein, the feeding tube assembly 304 is unreleasably coupled the reservoir 301. As used herein, the term unreleasably means that it would take undue forces to disassemble the feeding tube assembly from the reservoir. Such undue forces, if used in the disassembly, would damage the feeder beyond its designed mode of use.

Another embodiment of the present invention is illustrated in FIGS. 4A and 4B. A feeder 400 shown in FIG. 4A comprises a reservoir 401 and a feeding tube assembly 414. The reservoir 401 comprises a cylindrical wall 412, a closed top end 409 having a trough and surrounding an integral hanging tab 410, a bottom end 413 having a neck 402 with an opening 408 through which a feeding solution flows, and a skirt 404, which is an extension of the cylindrical wall, at the bottom end of the reservoir wall 412. Disposed around the inner circumference of the skirt 404 is an upwardly-angled lower annular flange 403, and optionally a downwardly-angle top annular flange 405, which is positioned between the lower annular flange 403 and the bottom end 413 of the reservoir.

The feeding tube assembly 414 comprises a bottom face having a shoulder 407, a top face 416 having a downwardly angled outer lip 412 around the perimeter of the top face 416, a conduit 415 with a receiving opening 406 which tightly fits over the neck 402 of the reservoir when the feeding tube assembly is coupled to the reservoir 401.

In assembling the feeder 400, the feeding tube assembly 414 is pushed onto the bottom 413 of the reservoir 401 with the opening 406 of the feeding tube assembly 414 mating with neck 402 and its opening 408 on the reservoir 401. With a slight force the downwardly-angled outer lip 412 of the feeding tube assembly 401 glides over the upwardly-angled lower flange 403 of the skirt 404 and into a secured position between the lower flange 403 and the bottom end 413 of the reservoir 401. The cooperatively angled lower flange 403 and outer lip 412 facilitate the insertion of the feeding tube assembly 414 into the skirt 404, as well as provide an interlocking mechanism preventing the feeding tube assembly from being released from the reservoir 401.

FIG. 4B illustrates the position of the outer lip 412 in relation to the lower flange 403 in an interlocking position. In such a cooperatively interlocking position, the feeding tube assembly 414 is unreleasably coupled to the reservoir 401 in such a manner that renders the feeder 400 as a one-time use only feeder in which refilling the reservoir 401 with a feeding solution would not be readily possible and thus reusing the feeder 400 would be discouraged. If the assembled feeding tube assembly 414 is separated from the reservoir 401, the outer lip 412 and/or the lower flange 403 would be destroyed thus rendering the feeder 400 non-reusable.

The optional downwardly-angled top flange 405 can serve as a stopper or a bias to prevent the feeding tube assembly 414 from sliding further toward the bottom end 413 of the reservoir. An alternative means for biasing the outer lip 412 to rest on the lower flange 403 to keep the feeding tube assembly from moving may include a spring disposed around the neck 402. A yet another alternative is not to have any stopper or biasing means at all. Instead, the frictional force between the neck 402 and the opening 406 may be advantageously used to keep the feeding tube assembly 414 in a fixed position.

The neck 402 shown in FIG. 4A as substantially cylindrical. However, the neck 402 may be tapered toward opening 408 such that a tighter seal can be achieved as the opening 406 of the feeding tube assembly 414 is pushed further onto the neck 402. A tapered neck 402 would also serve as a stopper to prevent the feeding tube assembly from being pushed completely into the skirt 404.

Figures 5A, 5B:
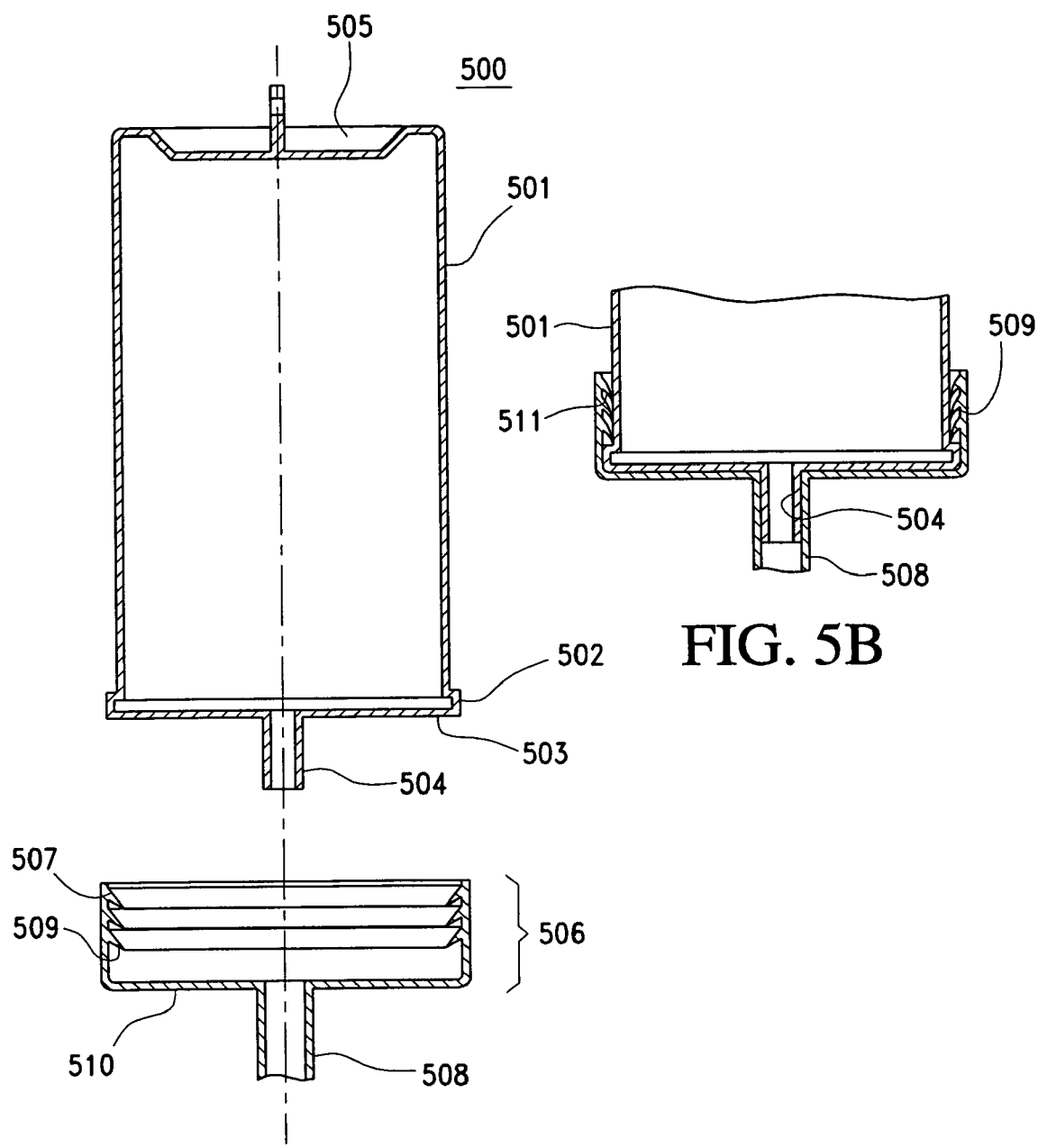
FIG. 5A is yet another embodiment of the present invention.
FIG. 5B illustrates the feeding assembly of FIG. 5A in a coupled position of the reservoir.

Another embodiment of the feeder of the present invention is shown in FIGS. 5A and 5B. A feeder 500 comprises a reservoir 501 and a feeding tube assembly 506. The reservoir 501 includes a closed top end 505 and an open bottom end. As shown in FIG. 5A, instead of being open, the bottom end can optionally be covered with an end face 503 having a spout 504, as an extra precaution against leakage. The bottom end of the reservoir comprises a brim 502. The feeding tube assembly 506 is cylindrical member with a side wall 509 defining a open end and a closed end 510 equipped with and spout or neck 508. The open end of the feeding tube assembly 506 communicates with the open end of the reservoir 501, if the reservoir does not have an end face 503 and a spout 504.

The interior of the side wall 509 comprises at least one tapered flange 507. The flange is preferably thinner at one edge and is thicker at the other edge, i.e., the base edge attached to the interior wall 509 so as to make it flexible at the thinner edge. The flange 507 is also angled such that during the insertion of the feeding tube assembly 506 over the reservoir, the brim 502 can easily glide over the angled flange in one direction, thus allowing the feeding tube assembly 506 to interlock with the brim 502 of the reservoir. Because of the angled flange and of the thick and structurally strong base edge, the feeding tube assembly 506 cannot be separated from the reservoir 501 without using undue forces. Moreover, as the flange 507 is flexible, it is bendable, as shown by flange 511 in FIG. 5B, to create a liquid-tight coupling between the feeding tube assembly 506 and the reservoir 501.

As previously mentioned, using undue forces to disassemble the feeder of the present invention would damage the feeder. In this particular embodiment, either the flange 507 or the brim 502 would be damaged. Therefore, the feeding tube assembly 506 is unreleasably coupled to the reservoir 501 in such a manner that renders the feeder 500 as a one-time use only feeder in which refilling the reservoir with a feeding solution would not be readily possible and thus reusing the feeder would be discouraged.

Figure 6:
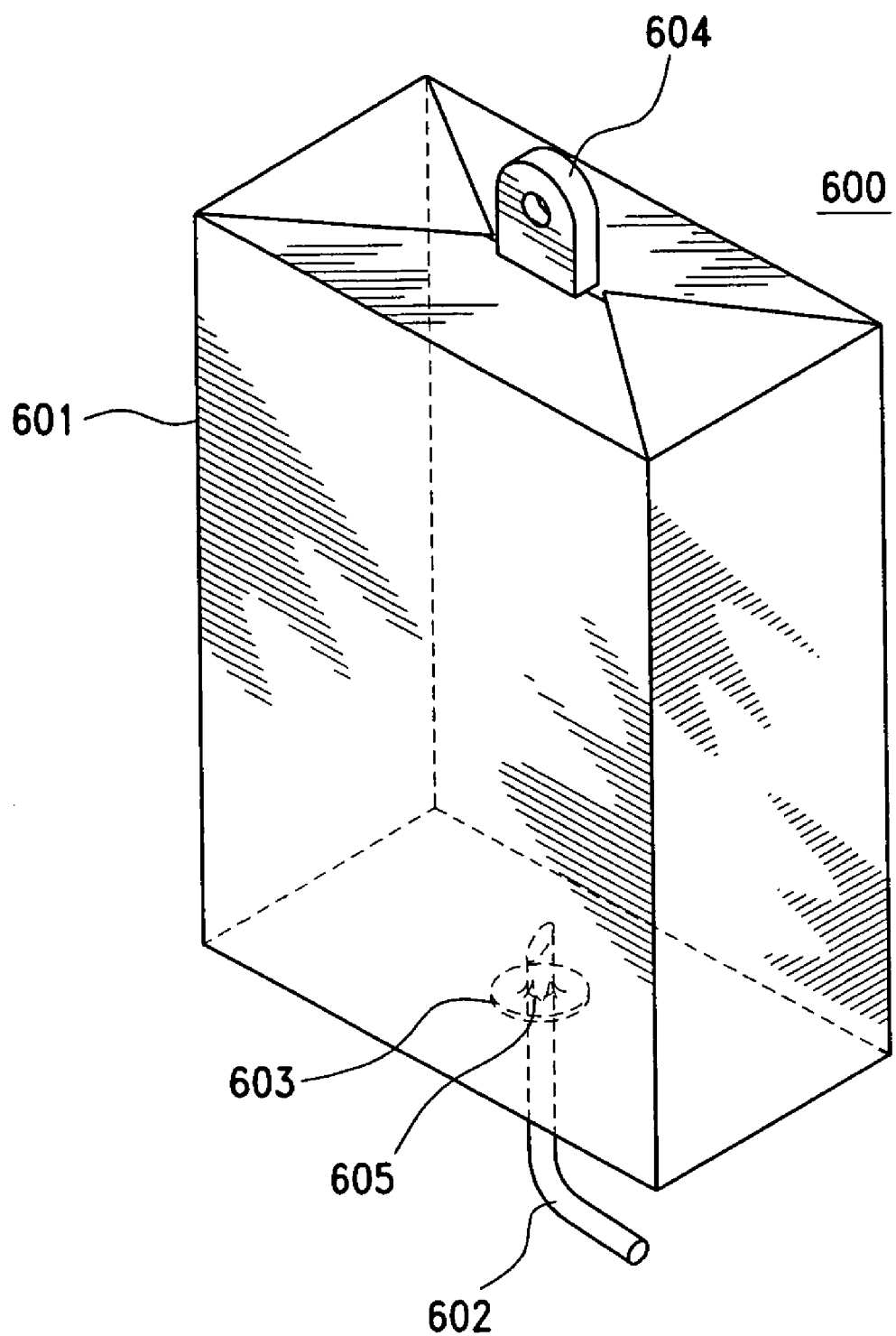
FIG. 6 is a perspective view of yet another embodiment of the present invention.

In yet another embodiment of the present invention shown in FIG. 6, a feeder 600 comprises a reservoir 601 and a feeding tube 602. The reservoir 601 has an opening 605 at a bottom end and a hanging tab 604 at the other end. The opening 605 is preferably covered with a frangible membrane (not shown) and is re-enforced with a flexible ring 603. A purpose of the flexible ring 603 is to retain the feeding tube 602 in place once it is inserted into the reservoir by pinching the wall of the feeding tube and providing a frictional grip thereon.

The reservoir 601 shown in FIG. 6 can be a rectangular box made of cardboard treated with a liquid impermeable layer. However, any type of container may be employed and any shape, size, color, or composition may be used.

Further provided is a hummingbird feeder kit comprised of a solution reservoir, and a feeding assembly, as exemplified herein. In a preferred embodiment, the solution reservoir is packaged with pre-made "ready-to-use" solution, or a dissolvable nutrient powder to which water can be added to form solution when the feeder is ready for use. The opening of the reservoir from which the solution is dispensed is covered by a removable cap or, more preferably, a piercable film to maintain the solution in the reservoir and maintain its composition and freshness until ready for use. In a preferred embodiment, the feeding assembly includes a piercing member which, when the user is prepared to assemble the feeder, can be used to easily puncture the piercable film so as to release the solution and make it accessible. Thus, where the solution reservoir is pre-packaged with a predetermined amount of "ready to serve" solution, one need only to remove a cap or film, and attach the feeding tube assembly, and hang the feeder. If, on the other hand, the solution reservoir is prepackaged with dissolvable, nutrient powder, one simply removes the film or cap and adds the predetermined amount of water to the solution reservoir containing the powder to form a feeding solution. The kit therefore provides a hummingbird feeder that is simple to assemble and easy to use.

The foregoing specific embodiments of the present invention as set forth in the specification herein are for illustrative purposes only. Various deviations and modifications can be made within the spirit and scope of this invention, without departing from the main theme thereof. This includes, but is not limited to, the design of the feeding tube assembly, the number of feeding tubes incorporated into the feeder, the incorporation of other embodiments, such as a resting perch, the size and shape of the feeder, and the material from which the feeder is composed. It will be appreciated by persons skilled in the art that the present invention is not limited by what has been particularly shown and described herein above.

What is claimed is:

1. A feed dispenser comprising:
   a feed reservoir for holding a nourishment;
   a feeding assembly including at least one conduit extending therefrom for conveying the nourishment from the feed reservoir to an animal; and
   a coupler for unreleasably coupling the feeding assembly to the feed reservoir such that the feed dispenser is rendered non-reusable upon disengagement of the feeding assembly from the feed reservoir,
   wherein the coupler comprises at least one reservoir flange disposed on the feed reservoir, at least one feeding assembly flange disposed on the feeding assembly adapted to unreleasably engage with the at least one reservoir flange when the feed reservoir is coupled to the feeding assembly; and said feeding assembly does not include any mechanism for closing a pathway for the nourishment at an interface of the at least one conduit and the feeding assembly.

2. The feed dispenser of claim 1, wherein the feeding assembly is adapted to receive a flow of nourishment from the feed reservoir.

3. The feed dispenser of claim 1, wherein the feed reservoir comprises a first end and a second end, and wherein the second end has an orifice through which the nourishment flows to the feeding assembly.

4. The feed dispenser of claim 1, wherein the feed reservoir comprises a first end and a second end, and wherein the second end comprises a neck having an orifice through which the nourishment flows to the feeding assembly.

5. The feed dispenser of claim 4, wherein said feeding assembly comprises a conduit having a first end and a second end, wherein the first end of the conduit is adapted to communicate with said orifice, and the second end is a feeding orifice adapted to provide nourishment to the animal.

6. The feed dispenser of claim 5, further comprising a frangible membrane covering the orifice.

7. The feed dispenser of claim 6, further comprising a gasket surrounding the orifice to prevent leakage of said nourishment between the orifice and the outside portion of said conduit.

8. The feed dispenser of claim 1, wherein said feeding assembly comprises a liquid conduit having a first end and a second end, wherein the first end of the conduit is adapted to mate with the neck and communicate with the orifice of the neck, and the second end of the conduit is a feeding orifice adapted to provide nourishment to the animal.

9. The feed dispenser of claim 1, further comprising a means for suspending the feed dispenser.

10. The feed dispenser of claim 1, further comprising an insect barrier.

11. The feed dispenser of claim of claim 1, wherein the at least one reservoir flange and the at least one feeding assembly flange are oppositely angled so as to permit movement relative to one another in one direction and restrict movement relative to one another in an opposite direction such that the feed reservoir and the feeding assembly interlock with each other.

12. The feed dispenser of claim 1, wherein the feed reservoir comprises a guide forming a path and the at least one reservoir flange is positioned on the path to form a directional restrictor, and wherein the at least one feeding assembly flange forms a collocated directional restrictor for unreleasably engaging with the directional restrictor on the feeding reservoir.

13. The feeding dispenser of claim 12, wherein the directional restrictor on the reservoir comprises a ramped surface connected to a blocking surface, and the collocated directional restrictor comprises a ramped surface connected to a blocking surface, wherein the ramped surfaces contact each other as the feeding reservoir is moved in a clockwise direction relative to the feeding assembly during the assembly of the feed dispenser, and the blocking surfaces contact each other when the feeding reservoir is moved in a counterclockwise direction relative to the feeding assembly after the assembling is completed.

14. The feed dispenser of claim 12, wherein the feeding assembly is adapted to receive a flow of nourishment from the feed reservoir.

15. The feed dispenser of claim 12, wherein the feed reservoir comprises a first end and a second end, and wherein the second end has an orifice through which the nourishment flows to the feeding assembly.

16. The feed dispenser of claim 12, wherein the feed reservoir comprises a first end and a second end, and wherein the second end comprises a neck having an orifice through which the nourishment flows to the feeding assembly.

17. The feed dispenser of claim 16, wherein said feeding assembly comprises a conduit having a first end and a second end, wherein the first end of the conduit is adapted to communicate with said orifice, and the second end is a feeding orifice adapted to provide nourishment to the animal.

18. The feed dispenser of claim 12, wherein said feeding assembly comprises a liquid conduit having a first end and a second end, wherein the first end of the conduit is adapted to mate with the neck and communicate with the orifice of the neck, and the second end of the conduit is a feeding orifice adapted to provide nourishment to the animal.

19. The feed dispenser of claim 12, further comprising a means for suspending the feed dispenser.

20. The feed dispenser of claim 12, further comprising an insect barrier.

21. The feed dispenser of claim 1, wherein the feeding assembly comprises a gasket for providing a liquid-tight seal between the feeding assembly and the feed reservoir.

22. The feed dispenser of claim 1, when said feeding assembly comprises:
 a threaded screw cap having the at least one conduit disposed thereon; and
 the feeding assembly flange comprises a first directional restricting member.

23. The feed dispenser of claim 22, wherein said feed reservoir further comprises a threaded neck and the reservoir flange comprises a second directional restricting member,
 the threaded screw cap is adapted to screw onto said threaded neck to provide a liquid-tight engagement therebetween, and
 the first and second directional restricting members cooperate with one another such that reversible movement between the feed reservoir and the feeding assembly is restricted once the directional restrictors are engaged with one another.

24. The feed dispenser of claim 23, wherein the conduit is retained in the orifice by frictional forces between edges of the feeding reservoir defining the orifice and the conduit.

25. The feed dispenser of claim 23, further comprising a gasket disposed between the screw cap and the threaded neck to provide a liquid-tight seal therebetween.

26. The feed dispenser of claim 1, wherein said nourishment is dissolvable in water.

27. The feed dispenser of claim 1, wherein said nourishment is a premixed liquid solution.

28. The feed dispenser of claim 27, wherein the conduit is adapted to pierce said frangible membrane when said conduit is inserted into said orifice, and to conduct feeding solution from the feeding reservoir.

29. The feed dispenser of claim 28, wherein the conduit is retained in the orifice by compression pressure exerted on the conduit by the gasket.

30. The feed dispenser of claim 1, wherein the feed reservoir comprises a brim and the at least one feeding assembly flange is adapted to be slideable over the brim into a locking position to form an unreleasable liquid-tight coupling between the feeding reservoir and the feeding assembly, and when in said locking position, said at least one conduit channels nourishment from the reservoir, through the feeding assembly, and to the animal.

* * * * *